United States Patent
Venkataraman et al.

(10) Patent No.: US 9,495,372 B2
(45) Date of Patent: *Nov. 15, 2016

(54) MULTI-TENANT AGILE DATABASE CONNECTOR

(71) Applicant: Corent Technology, Inc., Aliso Viejo, CA (US)

(72) Inventors: S. Venkataraman, Chennai (IN); Michael Oliver, Santo Domingo (PH); Jeya Anantha Prabu P, Nolambur (IN); Shafiullah Syed, Chennai (IN); R. Scott Chate, The Woodlands, TX (US)

(73) Assignee: CORENT TECHNOLOGY, INC., Aliso Viejo, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/693,734

(22) Filed: Dec. 4, 2012

(65) Prior Publication Data

US 2013/0097204 A1   Apr. 18, 2013

Related U.S. Application Data

(62) Division of application No. 13/412,150, filed on Mar. 5, 2012, now Pat. No. 8,326,876.

(60) Provisional application No. 61/538,687, filed on Sep. 23, 2011.

(51) Int. Cl.
 *G06F 17/30* (2006.01)
(52) U.S. Cl.
 CPC ..... *G06F 17/30091* (2013.01); *G06F 17/3056* (2013.01)
(58) Field of Classification Search
 None
 See application file for complete search history.

(56) References Cited

U.S. PATENT DOCUMENTS

| | | | |
|---|---|---|---|
| 5,724,575 A * | 3/1998 | Hoover et al. | |
| 6,366,921 B1 | 4/2002 | Hansen et al. | |
| 7,650,505 B1 | 1/2010 | Masurkar | |
| 7,917,607 B2 | 3/2011 | Becker et al. | |
| 7,933,869 B2 | 4/2011 | Becker et al. | |
| 7,958,251 B2 * | 6/2011 | Smith et al. | 709/231 |
| 8,069,184 B2 * | 11/2011 | Becker et al. | 707/783 |
| 8,386,431 B2 * | 2/2013 | Hahn et al. | 707/649 |
| 9,081,805 B1 * | 7/2015 | Stamen | G06F 17/30297 |
| 2003/0182424 A1 * | 9/2003 | Odendahl | 709/225 |
| 2003/0200209 A1 * | 10/2003 | Smith et al. | 707/3 |

(Continued)

FOREIGN PATENT DOCUMENTS

| | | |
|---|---|---|
| JP | 2004-310356 | 11/2004 |
| WO | 2008/042984 | 4/2008 |

OTHER PUBLICATIONS

Chong, F. et al., "Multi-Tenant Data Architecture", Microsoft, 2011, http://msdn.microsoft.com/en-us/library/aa479086.aspx.

*Primary Examiner* — Tyler Torgrimson
(74) *Attorney, Agent, or Firm* — Fish & Tsang, LLP

(57) ABSTRACT

A module provides an interface between a multi-tenant database and a non-tenant-specific application instance such that the application instance sends data access commands to the module as if it is communicating with a single-tenant database. The module translates the non-tenant-specific data access command from the non-tenant-aware application into a multi-tenant data access command, as needed, without needing to alter the non-tenant specific application instance in any way. In this manner, a single-tenant application could be used by multiple tenants in a multi-tenant environment.

12 Claims, 3 Drawing Sheets

(56) References Cited

U.S. PATENT DOCUMENTS

| | | |
|---|---|---|
| 2005/0010572 A1* | 1/2005 | Clark et al. .................. 707/10 |
| 2005/0188345 A1 | 8/2005 | Chang et al. |
| 2007/0239858 A1 | 10/2007 | Banerji et al. |
| 2008/0077806 A1* | 3/2008 | Cui et al. .................. 713/193 |
| 2008/0086482 A1 | 4/2008 | Weissman |
| 2008/0270459 A1 | 10/2008 | Grewal et al. |
| 2009/0037492 A1 | 2/2009 | Baitalmal et al. |
| 2009/0049056 A1 | 2/2009 | Shutt et al. |
| 2009/0254556 A1* | 10/2009 | Guo et al. .................. 707/8 |
| 2010/0005055 A1 | 1/2010 | An et al. |
| 2010/0005443 A1* | 1/2010 | Kwok et al. .................. 717/100 |
| 2010/0017415 A1* | 1/2010 | Kurumai et al. .............. 707/10 |
| 2010/0063959 A1 | 3/2010 | Doshi et al. |
| 2010/0077449 A1 | 3/2010 | Kwok et al. |
| 2010/0198730 A1 | 8/2010 | Ahmed et al. |
| 2010/0205595 A1 | 8/2010 | Weissman |
| 2010/0281014 A1 | 11/2010 | Weissman et al. |
| 2010/0293110 A1 | 11/2010 | Rosenthal et al. |
| 2011/0022642 A1 | 1/2011 | deMilo et al. |
| 2011/0213797 A1 | 9/2011 | Hess |
| 2011/0213870 A1 | 9/2011 | Cai et al. |
| 2011/0225165 A1 | 9/2011 | Burstein |
| 2011/0246449 A1 | 10/2011 | Collins et al. |
| 2011/0258620 A1* | 10/2011 | Gao et al. .................. 717/178 |
| 2011/0270857 A1 | 11/2011 | Bommireddipalli et al. |
| 2011/0307450 A1* | 12/2011 | Hahn et al. .................. 707/649 |
| 2012/0130988 A1 | 5/2012 | Nica et al. |
| 2013/0046787 A1* | 2/2013 | Ford et al. .................. 707/779 |

* cited by examiner

MULTI-TENANT AGILE DATABASE CONNECTOR

PRIORITY

This application is a divisional of U.S. patent application Ser. No. 13/412,150 filed Mar. 5, 2012, now issued U.S. Pat. No. 8,326,876, which is a non-provisional of U.S. Provisional Application No. 61/538,687 filed Sep. 23, 2011 and is incorporated herein by reference in its entirety.

FIELD OF THE INVENTION

The field of the invention is multi-tenant application devices.

BACKGROUND

When running software on large networked environments, it is sometimes more advantageous to execute a single instance of the application on one server by multiple tenants instead of executing separate instances of the application on several computers or virtual machines. Robust Fortune 500 applications may have long start-up and shut-down times, and may have high license costs which become expensive when deployed on several computer systems or virtual machines. In addition, it is easier to manage database traffic if only one application sends data access commands to a common database than if multiple application instances send data access commands to a common database.

WO2008042984 to Hofhansl and US20100005055 to An teaches a system and method for handling permissions for custom-made multi-tenant applications. Hofhansl and An, however, both require each programmer to customize each application to handle Hofhansl's system-specific package objects, version objects, and licensee objects, which requires a great deal of time and effort from each programmer. Hofhansl and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

US20080270459 to Grewal teaches a multi-tenant architecture where each application instance shares a middle-tier module where above the module each tenant executes its own instance of the application and below the module each tenant has its own private non-shared database. Grewal, however, requires each CRM application to be specifically configured to be tenant-aware in order to utilize the middle-tier module.

US20090049056 to Shutt teaches multiple server computers, where each server computer runs a separate instance of an application. Each tenant is then assigned to share a specific server computer with other tenants, and also a shared database accessible only to that server computer. Again, Shutt requires each application to be specifically configured to be tenant-aware in order to pass tenant information onto each server computer.

US20050188345 to Chang teaches a method for converting a single-tenant application into a multi-tenant application by applying a series of steps that must be performed in order to programmatically make a single-tenant application tenant-aware so that it can be deployed in a multi-tenant architecture. Chang fails to provide a simple way for a single-tenant application to be installed into a multi-tenant architecture without programmatically altering the application architecture.

US20100005443 to Kwok teaches a system and method of using a non-tenant-aware application with a multi-tenancy database by utilizing an administration module that allows a user to build and store user tenant-related relationships between the multi-user non-tenant-aware application and the multi-tenancy database. Kwok's administration module, however, requires the application to connect to two separate databases, one for tenant-agnostic data access commands which is connected directly to the non-tenant-aware application, and one for tenant-specific data access commands which is connected to the non-tenant-aware application through the administration module. Kwok fails to provide a method where a single database module could be utilized for any kind of data access command. Kwok's method also requires a significant amount of programming changes and effort to modify the original application. US201000017415 to Kurumai is a similar patent application that requires a significant amount of programming required to modify the original non-tenant-specific application to interface with a tenant-specific database.

Thus, there is still a need for improved methods of transforming a single-tenant application to have multi-tenant capability without significantly altering the original single-tenant application architecture.

SUMMARY OF THE INVENTION

It has yet to be appreciated that a system could be configured such that a non-tenant-aware application could be configured to have multi-tenant capability by providing a tenant-aware interface module between the non-tenant aware application and a multi-tenant data repository.

The inventive subject matter provides apparatus, systems and methods in which an interface module transparently handles non-tenant-specific data access commands from an application invoked by a tenant such that the application accesses data associated with the tenant without needing to be programmed to know any tenant information at all. As used herein, a "non-tenant-specific data access command" is a command to access data from a data repository, where the command does not contain any unique identifiers that identify a tenant, user of a tenant, or tenant data repository. Preferably, the non-tenant-specific data access command does not contain any identifiers associated with a tenant at all, for example an identifier associated with a specific group of tenants. As used herein, a "data repository" is any repository of data, which includes databases, such as SQL Server®, Oracle®, and Microsoft Access®, data-gathering devices, and also includes sensors, cameras, user interfaces, and other computer systems, or even storage devices, such as hard drives, optical drives, and tape drives, or portions thereof. As used herein, a "data access command" is any software command used to access data, including read data commands, write data commands, update data commands, insert data commands, and delete data commands. As used herein, a "tenant" is a collection of users that share logically isolated data and content. Such isolated data could be isolated "physically," such as with physically separate databases, or could be isolated "logically," such as by limiting access by tenants to data within a database commonly shared by multiple tenants.

The interface module is typically installed on a computer system having an application that is not tenant-aware, and a data collection module that accesses information on one or more data repositories. As used herein a program or an application that is "non-tenant-aware" is one that has not been programmed with the ability to differentiate one tenant user from another tenant user. For example, applications that have been designed to run on computer systems with only a single user account are non-tenant-aware. Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the inventive subject matter allows a user to install an application designed for single-tenant use onto a multi-tenant system to be used by multiple tenants without needing to share data between tenants or to programmatically alter the application to be used with the system.

An exemplary interface module is generally functionally connected to a non-tenant-aware application such that the interface module receives data access commands from the non-tenant-aware application and returns results from the data access commands to the non-tenant-aware application. From the perspective of the non-tenant-aware application, the interface module appears to be a single-tenant or a non-tenant-aware data collection module. That is, the interface module appears to accept non-tenant-specific data access commands from the non-tenant-aware application, executes those data access commands, and returns a result from the non-tenant-specific data access commands.

In reality, the interface module actually accepts non-tenant-specific data access commands and translates them into tenant-specific data access commands where needed. In order to perform this task, the interface module generally receives a unique identifier associated with the tenant invoking the application from a tenant-aware non-application source. As used herein, "tenant-aware" means that a module is able to access an identifier that identifies either a particular tenant or a particular data repository accessible by that particular tenant. Contemplated non-application sources include an LDAP server, a tenant log-in module which is invoked prior to the tenant gaining access to the application, or a table within the data repository. Whatever the non-application source, the interface module could then use the unique identifier to modify the non-tenant-specific data access command into a tenant-specific data access command without needing the application to be tenant-aware.

Some data access commands from the non-tenant-aware application may not need to be translated into a tenant-specific data access command prior to execution. For example, a data access command that accesses publicly available data accessible to any tenant. In order to minimize the amount of time to complete a data transaction, the interface module preferably has a handler that analyzes the non-tenant-specific data access command sent from the application and authorizes whether the non-tenant-specific data access command needs to be translated into a tenant-specific data access command. For example, the handler could transmit an authorization Boolean value to the translator. When the handler fails to authorize a translation, the non-tenant-specific data access command could then be passed directly to the data collection module to execute. However, when the handler authorizes a translation from a non-tenant-specific data access command to a tenant-specific data access command, the interface module preferably then uses a translator that translates the non-tenant-specific data access command into a tenant-specific data access command.

As used herein, a "tenant-specific data access command" is a data access command that has been generated for the tenant who invoked the application on the computer system. In the simplest sense, a tenant-specific data access command could include both the non-tenant-specific data access command as well as the unique identifier associated with the tenant such that the data connector only accesses a subset of data associated with the unique identifier of the tenant. In another embodiment, the translator could simply append the name of a database or database table assigned to that tenant to the non-specific data access command when generating the tenant-specific data access command. (In such embodiments, the named database or database table could be set up to be associated with only that one tenant) In yet another embodiment, the translator could parse the non-tenant-specific data access command into its component parts and perform an analysis of the data access command with respect to the unique identifier associated with the tenant in order to construct an appropriate tenant-specific data access command.

The translator could also access a security access lookup table either within the data repository or located elsewhere on the computer system to determine what data sources the tenant has access to. For example, the security access lookup table could provide a list of databases within the data repository that the tenant has access to, or could provide a list of tables within a database, or a subset of rows and/or columns within a database that the tenant has access to. The translator could then compare the non-tenant-specific data access command against the tenant-accessible data sources to ensure that the tenant-specific data access command only accesses data accessible by the tenant. In some embodiments, such tenant-specific data lies in specific databases accessible only by the tenant or specific data tables accessible only by the tenant. If the non-tenant-specific data access command specifically names a data repository that is not one of the tenant-accessible data sources, the translator could then return an error to the application, informing the application that the current tenant does not have access to that data repository.

The translator could also be configured to optimize the tenant-specific data access command in order in accordance with one or more algorithms. For example, an algorithm could be used that optimizes a data access command depending upon what type of data repository is being accessed, or an algorithm could be used that optimizes a data access command depending upon what type of application is attempting to access the data repository. By using such algorithms, the translator could parse the non-tenant-specific data access command, generate a tenant-specific data access command using the non-tenant-specific data access command and the unique identifier associated with the tenant, and could then optimize the tenant-specific data access command before execution to reduce the load on the data collection module. In contemplated embodiments, the translator could possibly create two or more tenant-specific data access commands. For example, separate tenant-specific data access commands could be created to access data in different data repositories, or a plurality of tenant-specific data access commands could be executed serially or concurrently on the same data repository to optimize performance.

Once the tenant-specific data access command is generated by the translator, the interface module could then transmit the tenant-specific data access command (or the non-tenant-specific data access command in situations where the handler fails to authorize a translation) to a data collection module. The data collection module could be installed on the computer system that the interface module is installed upon, or the data collection module could be accessible via a network connection. In either case, the data collection module ensures that the data access command sent by the interface module is executed on the data repository, either by executing the data access command itself, or by forwarding the data access command to a module capable of executing the data access command. As used herein, a "data collection module" is a module that collects data from a data repository, whether that repository be a database, a memory drive, a directory structure, a real-time data collection device, or some other known data repository. In exemplary embodiments, the data collection module is a software or hardware module that accesses data on a database.

The data collection module could execute the data access command via one or more appropriate standard database connector. As used herein, a "standard database connector" is a computer module that allows an application to send data access commands to a data repository based on well-known standards adopted by the industry, such as an ODBC driver, a JDBC driver, and an ADOdb driver, or based on standards that will be adopted by the industry for other data repositories. Alternatively, the data collection module could execute the data access command using one or more proprietary database drivers, or a combination thereof. Proprietary database drivers might be necessary, for example, where the data repository is a specialized proprietary device.

In an alternative embodiment, the data collection module could require one or more security certificates from the interface module in order to access certain data repositories. For example, the database module could require one or more encryption keys that are provided by the application and/or by the interface module to encrypt information into the data repository or to decrypt information received by the data repository. In one embodiment, the tenant-specific data access command itself could comprise an encryption key that encrypts unencrypted data into encrypted data before writing the encrypted data to the data repository. Such an encryption key could be sent by the application with the non-tenant-specific data access command, or could be added to the tenant-specific data access command by the translator. In other embodiments, the translator could encrypt the data and embed encrypted data into the tenant-specific data access command so that the data repository only holds encrypted data. Once the database module executes the data access command, the interface module preferably retrieves a result set and returns that result set to the application, where the data access command requests a result set.

Preferably the interface module is configured to handle a plurality of applications invoked by a plurality of tenants, respectively, at one time. In some configurations, each tenant has access to only its own data, while in other configurations, super-tenants could have access to the data accessible to one or more other tenants. For example, a first tenant could have access only to database one, while a second tenant has access to only database two, while a third tenant has access to both databases one and two, where databases one and two are non-overlapping.

Generally, without an interface module, a non-tenant-aware application would communicate with a database driver, such as a standard or a proprietary database driver. An exemplary interface module would mimic such a database driver, which would modify standard non-tenant-aware database calls and send the modified request to database drivers that control access to a tenant-aware database or a data collection module.

Various objects, features, aspects and advantages of the inventive subject matter will become more apparent from the following detailed description of preferred embodiments, along with the accompanying drawing figures in which like numerals represent like components.

One should appreciate that the disclosed techniques provide many advantageous technical effects including the ability to easily and quickly install a non-tenant-aware application into a tenant-aware database system by providing an interface module that translates data access commands and responses between the non-tenant-aware application and the tenant-aware database system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein, and unless the context dictates otherwise, the term "subset" is indented not to include the full set, or the null set. Thus, when a set contains the elements [0, 1, 2], subsets include [0], [1], [2], [0, 1], [0,2], and [1,2], but do not include [ ] or [0, 1, 2].

DETAILED DESCRIPTION

Figure 1:
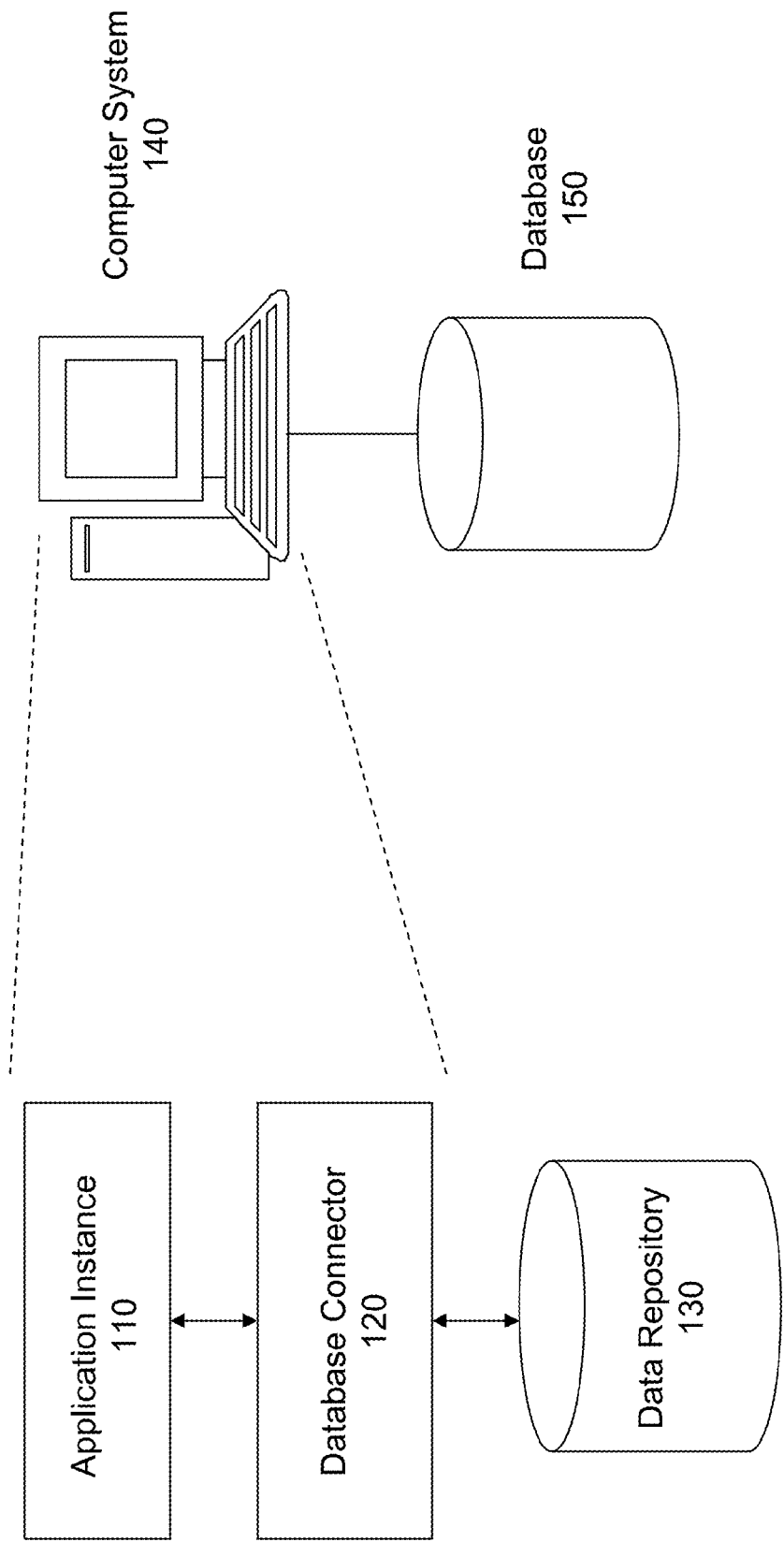
FIGS. 1A and 1B are schematics of prior art single-tenant application instantiated on a computer system.

In FIGS. 1A and 1B, a prior art application installed on computer system 140 is typically invoked as an application instance 110. The application instance 110 then communicates with database connector 120, also installed on computer system 140, via non-tenant-specific data access commands such as read commands, insert commands, and update commands. Database connector 120 could then execute those non-tenant-specific data access commands upon data repository 130, shown in FIG. 1B as database 150. This is the default configuration that the application (not shown) installed on computer system 140 is typically designed for, and most applications available upon computer systems are typically designed for. A single user may open multiple application instances on the same computer, for example when the user needs to open multiple windows to deal with a plurality of data entry forms, but the user typically only accesses a single data repository via non-tenant-specific data access commands from the application.

Figure 2:
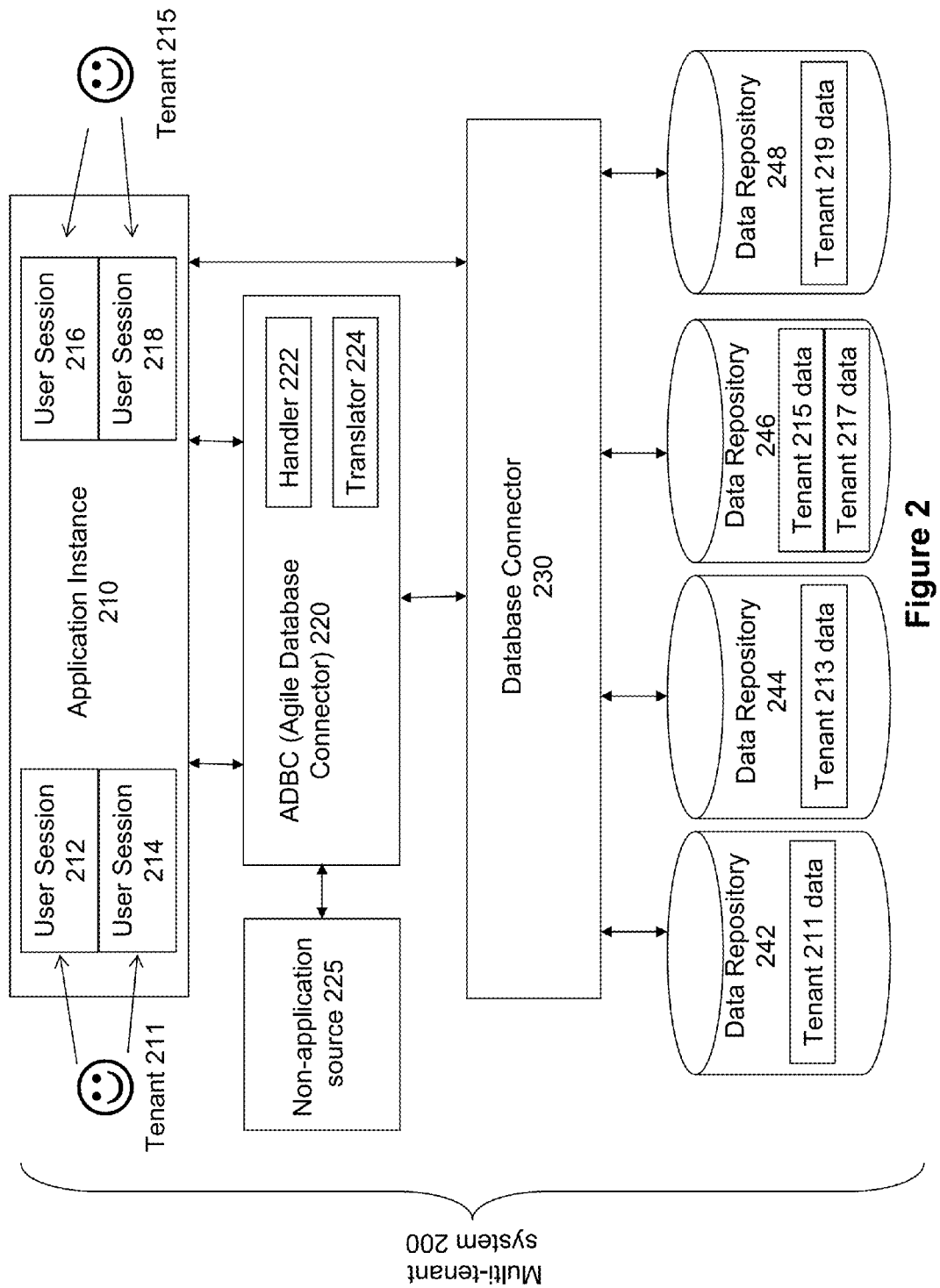
FIG. 2 is a schematic of a contemplated multi-tenant computer system.

In FIG. 2, an exemplary multi-tenant system 200 has an application instance 210, an agile database connector (ADBC) 220, a standard database connector 230, and data repositories 242, 244, 246, and 248, respectively. As used herein, an "agile database connector" is one whose communication with an application generally comprises non-tenant-specific data access commands and responses, but whose communication with a database connector or a database generally comprises tenant-specific data access commands and responses. As such, an "agile" database connector is configured to adapt to data access commands from an application that does not include any tenant-specific information by translating non-tenant-specific data access commands into tenant-specific data access commands. Application instance 210 is not tenant-aware. ADBC 220 is configured to be tenant-aware and is configured to associate a data access command with a data repository, associated with a particular tenant. In this way, an application instance 210 could be used in multi-tenant system 200 without needing to modify the application instance 210 in such a way that the application instance 210 needs to be tenant-aware.

In order for ADBC 220 to be tenant-aware, ADBC 220 is configured to use a unique identifier associated with the data access command to infer, from a non-application source, the appropriate tenant associated with the data access command. That non-application source could be any suitable source, for example an LDAP server, some other sort of log-in application or library, or from tenants 211 and 215 directly. As used herein, the "unique identifier" could be any suitable identifier, for example a unique Java Session IS associated with the logged in user is associated with the data access command, and this can be associated with a named user, which in turn could be associated by some method, such as a lookup table or function, with a particular tenant or group of tenants.

In this embodiment shown in FIG. 2, application instance 210 is instantiated by a SaaS (Software as a Service) vendor or service (not shown). Tenant 211 could have two users (not shown) invoke user sessions 212 and 214, respectively, while tenant 215 has two users invoke user sessions 216 and 218, respectively, by logging on to application instance 210. ADBC 220 could receive the non-tenant specific data access command from application instance 210 and infers the tenant to which that user session belongs using a non-application source 225. Non-application source could be any source separate from the application that understands the identity of the tenant associated with the user, for example an LDAP directory, a user rights management system, or a security lookup table. ADBC 220 infers the tenant for a user session by using information from the user session, for example a user session identifier, a user interface device identifier, or a user session location identifier, an IP address, or a special encryption key, to determine a unique identifier associated with the tenant to which that user session belongs. In an exemplary embodiment, ADBC 220 queries a user session table with a user identifier to determine the unique identifier of the tenant to which the user session belongs.

A handler 222 will generally analyze the non-tenant-specific data access command sent from application instance 210 and will then determine whether the non-tenant-specific data access command should be translated into a tenant-specific data access command. If so, handler 222 will send an authorization to translator 224, authorizing translator 224 to translate the non-tenant specific data access command into a tenant-specific data access command to access a subset of data specific to that tenant within one of the data repositories 242, 244, 246, 248. In this manner, a non-tenant specific data access command from user session 212 or 214 would be translated into a tenant-specific data access command to access tenant 211 data in data repository 242, and a non-tenant specific data access command from user session 216 or 218 would be translated into a tenant-specific data access command to access tenant 215 data in data repository 246. In some instances, the tenant-specific data access command sent to database connector 230 comprises a plurality of commands, which could all be run on a single data repository or could be divided between a plurality of data repositories. This is especially useful where a single tenant's data is split among several data repositories. Thus, even though the application is not tenant-aware, when the application sends non-tenant aware data access commands, the database connector provided with, and is able to execute tenant-specific data access commands.

In some instances, handler 222 will analyze the non-tenant-specific data access command and determine that the non-tenant-specific data access command does not need to be translated into a tenant-specific data access command, and could then be passed through to data connector 230 without alteration. This could occur, for example, when the handler detects that the non-tenant-specific data access command is accessing data that is public to all tenants, or is accessing data that is application-specific instead of tenant-specific. As such, ADBC 220 will transmit a translated tenant-specific data access command to database connector 230 when handler 222 authorizes a translation of the non-tenant-specific data access command, or will transmit the untranslated non-tenant-specific data access command to database connector 230 when handler 222 fails to authorize a translation of the non-tenant-specific data access command.

In the multi-tenant system 200, each of the data repositories 242, 244, 246, and 248 are associated with one or more tenants. Such that data repository 242 is associated with tenant 211, data repository 244 is associated with tenant 213 (not shown), data repository 246 is associated with tenant 215 and tenant 217 (not shown), and data repository 248 is associated with tenant 219 (not shown). In another embodiment, a super-tenant could be configured by the system to be able to access the data of a plurality of tenants, for example tenant 219 might also be able to access all of data repository 246, giving tenant 219 access to the data of tenant 215 and tenant 217. In such an embodiment, tenant 215 does not have access to tenant 219's data or to 217's data, and tenant 217 does not have access to tenant 215 or 219's data. Each data repository could be of a different type, for example data repository 242 could be a Microsoft SQL Server database while data repository 244 could be an Oracle Database.

Once ADBC 220 creates the new tenant-specific data access command, ADBC 220 could then send that command to database connector 230 for execution. Database connector 230 could be any standard driver, for example an ODBC driver, a JDBC driver, or an ADOdb driver, or could be a custom-created driver that accesses data from other data repositories, such as devices that dynamically collect or handle real-time or other data (i.e. GPS devices upon a cellphone, or a thermometer in a distal location). In an exemplary embodiment, ADBC 220 is configured to parse the data access command and possibly optimize the tenant-specific data access command in order to improve performance, or in accordance to an algorithm specific to an application.

In an alternative embodiment, ADBC 220 could be configured to be a completely separate from any underlying database facilities, such as database connector 230 to prevent gridlock in the underlying database facilities. ADBC 220 is also preferably configured to handle concurrent requests sent from different application instances. For example, let's say tenant 211 uses user session 212 in application instance 210 to send a first data access command and tenant 213 uses user session 214 in application instance 210 to send a second data access command at the same time. ADBC 220 could be configured to serialize each tenant-specific data access command to be sent to database connector 230 in order to prevent gridlock in the system.

ADBC 220 could also be configured to handle security access to allow or prevent tenants from accessing specific tables, or could allow or prevent tenants from accessing table entries within a data repository. For example, each table could be configured to be accessible by only one specific tenant, or each row could be configured to be accessible by only one specific tenant. In another embodiment, each row or table has a tenant security ID specific to a tenant granted access to that row or table, respectively. A security access table could be set up within one of the data repositories themselves, or could be soft or hard-coded within ADBC 220 to enforce certain security access. Such a security access table could be configured to only allow partial access, for example read-only access or update-only access. In an exemplary embodiment, ADBC 220 not only includes a unique identifier associated with the tenant, such as a table that only the tenant has access to, but also includes a security username/password combination in order to gain entry to a data repository. In a preferred embodiment, ADBC 220 uses existing user logon credentials received from each user session when sending data access commands to database connector 230. This allows ADBC 220 to not only infer a tenant from the user's logon credentials, but also associates any allows ADBC 220 to associate any specific additional security restrictions to that specific combination of user and tenant.

Figure 3:
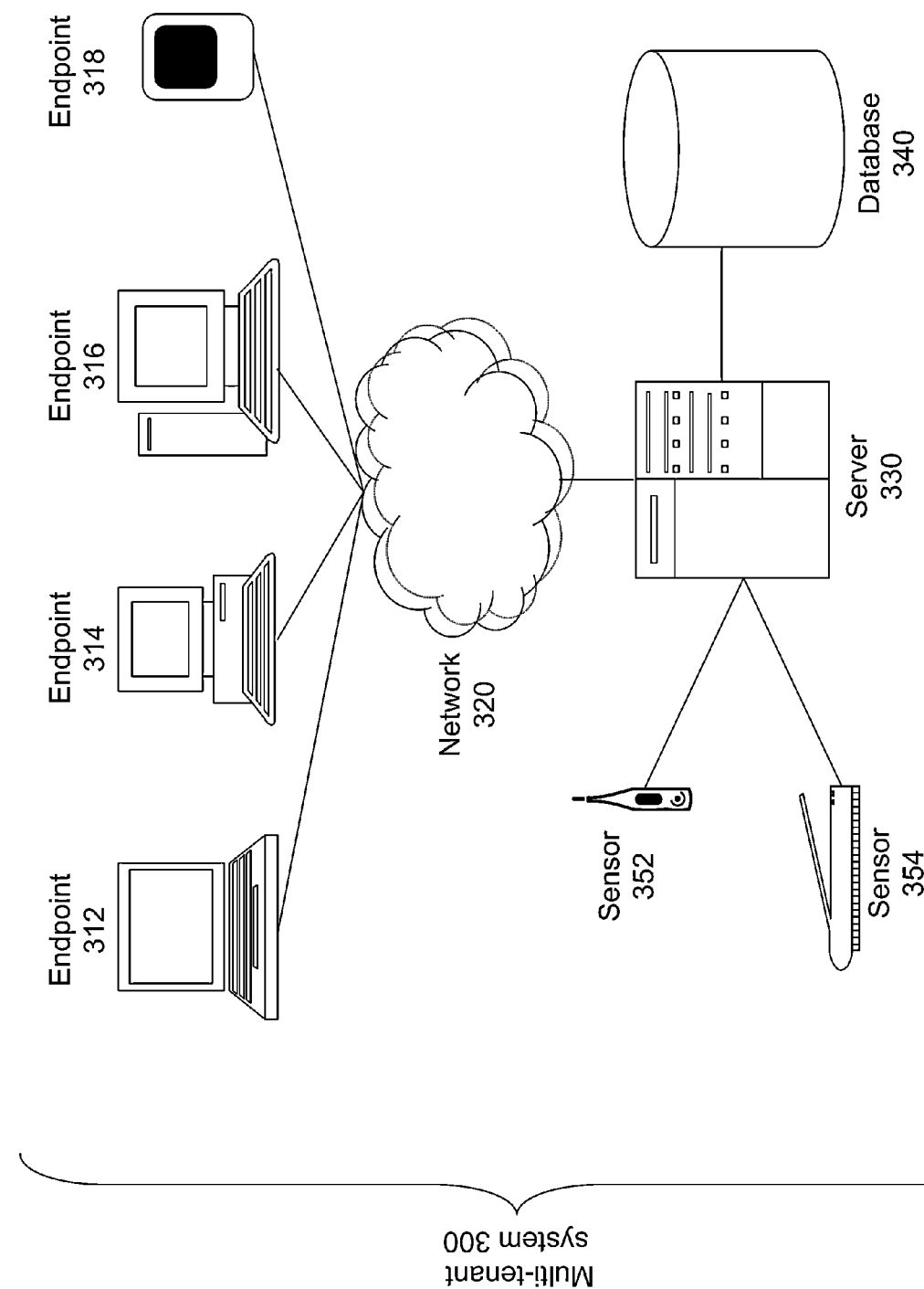
FIG. 3 is a schematic of the hardware configuration of a multi-tenant computer system.

FIG. 3 shows an exemplary architecture for an embodiment of the inventive subject matter. Endpoints 312, 314, 316, and 318 are shown here euphemistically as computer terminals that could be accessed by any user of a tenant with appropriate log-in information to log into the system. In some embodiments, each computer terminal has its own authentication system, such as an LDAP directory, for a user to authenticate access to the system, and then access the non-tenant-aware application installed on server 330 via network 320. Network 320 could be any suitable network that functionally couples a computer terminal with a computer server, for example a corporate intranet or the public Internet, and could be accessed using wired or wireless access points. Server 330 services the non-tenant-aware application to each of the computer terminals by invoking a user interface of the application on each terminal as the application is invoked. Each endpoint 312, 314, 316, and 318 preferably has a client installed that communicates with server 330 to access the non-tenant aware application. For example, each endpoint could have a web browser client and server 330 could service applications through a SaaS website.

Once a user accesses server 330, server 330 invokes an instance of the non-tenant application for access by the user and, through the ADBC and standard database connectors, allows the non-tenant application to access data on database 340 or sensors 352 and 354, remaining sensitive to the multi-tenancy of the system by ensuring that each user only accesses data associated with the user's tenant. In this manner, although the users logging in at each endpoint may be tenant-aware, and the server 330 may be tenant-aware, the application installed upon 330 does not need to be tenant-aware and need not be modified in order to be used by the exemplary system.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer processor implemented system that facilitates concurrent, multi-session use of a non-tenant aware application by first and second tenants to access at least a first non-tenant aware data repository, utilizing unique tenant identifiers obtained from a tenant-aware non-application source, without requiring modification of the non-tenant aware application or the first non-tenant aware data repository, comprising:

an agile database connector configured to infer unique tenant identifiers from the tenant-aware non-application source, where the agile database connector has:

a translator logically disposed between (a) the first non-tenant aware data repository and (b) the application, and configured to translate at least first and second non-tenant specific data access commands received from the application into first and second tenant-specific data access commands, respectively, using the inferred unique tenant identifiers; and a handler separate from the non-application source, the handler logically disposed between (a) the first non-tenant aware data repository and (b) the application, and configured to pass the first and second tenant-specific data access commands to the first data repository, respectively;

wherein first and second tenant-specific outputs from the first non-tenant aware data repository are forwarded to the application without passing back through the translator and handler, and wherein the tenant-aware non-application source is external to the non-tenant aware application and the non-tenant aware data repository.

2. The system of claim 1, wherein the translator is further configured to receive from a source other than the application a unique identifier associated with the first tenant, and to use the unique identifier in preparing the tenant-specific data access commands for a session of the application operated by first user.

3. The system of claim 1, wherein the translator is configured to authorize which of the non-tenant specific data access commands are translated to the tenant-specific data access commands.

4. The system of claim 1, wherein the handler is further configured to concurrently accommodate, in a tenant-aware fashion, first and second sessions of the application by the first tenant, and first and second sessions of the application by the second tenant.

5. The system of claim 1, further comprising a second non-tenant aware data repository.

6. The system of claim 1, wherein the translator translated third and fourth non-tenant specific data access commands received from the application into third and fourth tenant-specific data access commands.

7. The system of claim 6, wherein the handler passes both the third and fourth tenant-specific data access commands to a third non-tenant aware database, and forwards third and fourth tenant-specific outputs from the third data repository to the first and second tenants, respectively.

8. The system of claim 1, wherein the first and second tenant-specific data access commands comprise a first encryption key and a second encryption key, respectively.

9. The system of claim 8, further comprising a database module, wherein the database module is configured to decrypt the first and second tenant-specific outputs from the first data repository with the first and second encryption keys, respectively.

10. The system of claim 1, wherein the handler analyzes the non-tenant-specific data access command sent from the application, and authorizes whether the non-tenant-specific data access command needs to be translated into a tenant-specific data access command.

11. The system of claim 1, wherein the handler is configured to utilize an LDAP server having a tenant log-in module as the non-application source, which is invoked prior to the first tenant gaining access to the non-tenant aware application, or a table within the first data repository.

12. The system of claim 1, wherein the application is a non-tenant aware application.

* * * * *